(12) United States Patent
Ono et al.

(10) Patent No.: US 7,614,473 B2
(45) Date of Patent: Nov. 10, 2009

(54) VEHICLE BODY STRUCTURE

(75) Inventors: Tohru Ono, Wako (JP); Takahiro Sugawara, Wako (JP); Takayuki Ogawa, Wako (JP); Koichi Yamamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 531 days.

(21) Appl. No.: 11/426,776

(22) Filed: Jun. 27, 2006

(65) Prior Publication Data

US 2006/0289224 A1 Dec. 28, 2006

(30) Foreign Application Priority Data

Jun. 28, 2005 (JP) .............................. 2005-188202
May 24, 2006 (JP) .............................. 2006-144383

(51) Int. Cl.
  B60K 1/00 (2006.01)
  B60K 6/32 (2007.10)
(52) U.S. Cl. ..................... 180/299; 180/291; 180/65.1
(58) Field of Classification Search ................ 180/291, 180/299, 296, 65.1, 309, 69.4, 295, 89.2, 180/312
See application file for complete search history.

(56) References Cited

U.S. PATENT DOCUMENTS

| 667,189 | A | * | 2/1901 | Condict | 180/65.1 |
|---|---|---|---|---|---|
| 1,856,005 | A | * | 4/1932 | Tomshow | 180/89.2 |
| 2,119,193 | A | * | 5/1938 | Avery | 180/291 |
| 2,808,892 | A | * | 10/1957 | Walker | 180/69.4 |
| 4,365,681 | A | * | 12/1982 | Singh | 180/68.5 |
| 4,593,786 | A | * | 6/1986 | Tate | 180/291 |
| 5,305,513 | A | * | 4/1994 | Lucid et al. | 29/402.08 |
| 5,392,873 | A | * | 2/1995 | Masuyama et al. | 180/68.5 |
| 5,477,936 | A | * | 12/1995 | Sugioka et al. | 180/68.5 |
| 5,556,133 | A | * | 9/1996 | Oku et al. | 280/781 |
| 5,641,031 | A | * | 6/1997 | Riemer et al. | 180/65.3 |
| 5,673,940 | A | * | 10/1997 | Gaisford et al. | 280/834 |
| 5,704,644 | A | * | 1/1998 | Jaggi | 280/796 |
| 5,918,692 | A | * | 7/1999 | Sekita et al. | 180/56 |
| 6,086,103 | A | * | 7/2000 | Fukagawa et al. | 280/830 |
| 6,099,042 | A | * | 8/2000 | Cook et al. | 280/834 |
| 6,120,059 | A | * | 9/2000 | Beckman | 280/785 |
| 6,188,574 | B1 | * | 2/2001 | Anazawa | 361/695 |
| 6,220,380 | B1 | * | 4/2001 | Mita et al. | 180/65.1 |
| 6,315,069 | B1 | * | 11/2001 | Suba et al. | 180/68.5 |
| 6,347,681 | B1 | * | 2/2002 | Patmont et al. | 180/220 |
| 6,398,262 | B1 | * | 6/2002 | Ziech et al. | 280/785 |
| 6,491,123 | B1 | * | 12/2002 | Pasquini et al. | 180/68.5 |
| 6,648,085 | B2 | * | 11/2003 | Nagura et al. | 180/65.1 |

(Continued)

FOREIGN PATENT DOCUMENTS

JP   2004-291934   10/2004

*Primary Examiner*—Paul N Dickson
*Assistant Examiner*—Chiedu A Chibogu
(74) *Attorney, Agent, or Firm*—Rankin, Hill & Clark LLP

(57) ABSTRACT

A vehicle body structure includes a body frame with a sub-frame mounted to a lower part of the body frame. The subframe is formed into a rectangular shape and has front, intermediate and rear cross members. A storage battery is designed to be mounted astride the front cross member and the intermediate cross member. A fuel tank is designed to be mounted astride the intermediate cross member and the rear cross member.

14 Claims, 9 Drawing Sheets

U.S. PATENT DOCUMENTS

| | | | |
|---|---|---|---|
| 6,843,524 B2 * | 1/2005 | Kitagawa | 296/187.09 |
| 6,893,047 B2 * | 5/2005 | Chou et al. | 280/834 |
| 6,948,226 B2 * | 9/2005 | Chernoff et al. | 29/428 |
| 7,137,466 B2 * | 11/2006 | Kawasaki et al. | 180/65.3 |
| 7,270,202 B2 * | 9/2007 | Kondo | 180/65.1 |
| 7,270,209 B2 * | 9/2007 | Suess | 180/69.5 |
| 2003/0037983 A1 * | 2/2003 | Hanaya et al. | 180/309 |
| 2003/0070858 A1 * | 4/2003 | Kondo | 180/291 |
| 2004/0062955 A1 * | 4/2004 | Kubota et al. | 429/9 |
| 2004/0108677 A1 * | 6/2004 | Sekiguchi | 280/124.109 |
| 2004/0200659 A1 * | 10/2004 | Miyasaka | 180/312 |
| 2005/0161935 A1 * | 7/2005 | Ono et al. | 280/834 |
| 2005/0287404 A1 * | 12/2005 | Takahashi | 429/21 |
| 2007/0051549 A1 * | 3/2007 | Fukuda | 180/232 |

* cited by examiner

VEHICLE BODY STRUCTURE

FIELD OF THE INVENTION

The present invention relates to a vehicle body structure in which a compressed gas fuel tank and a storage battery are disposed on a vehicle body frame.

BACKGROUND OF THE INVENTION

Vehicle body frames are provided with a subframe mounted in the lower portion of the frame, and compressed gas fuel tanks and storage batteries are disposed on the subframe. The vehicle body structure disclosed in Japanese Patent Laid-Open Publication No. 2004-291934, for example, is described below with reference to FIG. 9 hereof.

FIG. 9 is a diagram that describes the prior art. Since the conventional vehicle body structure 201 has a configuration in which electric storage devices 204 and 205 and hydrogen tanks (compressed gas fuel tank) 206 and 207 are mounted on a subframe 203, and the subframe is mounted on a floor main frame 202, assembly is facilitated and vehicle interior space and trunk capacity can be expanded.

However, in the above-described conventional vehicle body structure 201, the electric storage devices 204 and 205 are aligned behind the hydrogen tank 206, and the rear-side hydrogen tank 207 is disposed behind the electric storage devices 204 and 205. There is therefore a problem in that the size of the structure increases in the front/rear direction and the electric storage devices cannot be efficiently accommodated.

Also, in the above-described conventional vehicle body structure 201, there is a problem in that the electric storage devices 204 and 205 are mounted on a cross member 208 of the floor main frame 202 by using four brackets 209, and it is therefore laborious to mount and remove the electric storage devices 204 and 205.

Another prior art, as disclosed, for example, in Japanese Patent Laid-Open Publication No. 2003-285648, has a configuration in which the storage batteries are mounted on the vehicle body frame. This configuration is described below with reference to FIG. 10 hereof.

FIG. 10 is a diagram showing the other prior art described above. The arrangement structure 231 of the electric storage device of the prior art has an electric storage device 233 disposed in an upright orientation behind a rear seat 232, and an upper mounting unit 234 and a lower mounting unit 235 mounted on the vehicle body. As a result, the structure can be provided with adequate support rigidity without sacrificing vehicle interior space.

However, in the arrangement structure 231 of the electric storage device of the prior art, there is a problem in that the rear trunk capacity is reduced by the electric storage device 233 disposed behind the rear seat 232.

Also, placing the electric storage device 233 in an upright orientation behind the rear seat 232 creates a problem whereby the position of the center of gravity of the vehicle is elevated in comparison with a structure in which the electric storage device is disposed on the bottom side of the vehicle body.

SUMMARY OF THE INVENTION

According to an aspect of the present invention, there is provided a vehicle body structure comprising a vehicle body frame extending in a front-rear direction of the vehicle body, and a subframe mounted on a lower portion of the vehicle body frame, wherein the subframe is formed in a rectangular shape having side frames extending in the front/rear direction of the vehicle body and disposed on the left and right of the vehicle body, a front cross member mounted on the front end of the left and right side frames, an intermediate cross member mounted parallel to the front cross member and attached to the left and right side frames, and a rear cross member mounted parallel to the front cross member on the rear end of the left and right side frames, and wherein the front cross member and the intermediate cross member allow a storage battery to be mounted, and the intermediate cross member and the rear cross member allow a fuel tank to be mounted.

In the vehicle body structure thus arranged, the space between the front cross member and the intermediate cross member of the subframe can be used to accommodate a storage battery. The vehicle space can therefore be effectively used and a storage battery can be disposed with a low center of gravity. A storage battery and fuel tank can be surrounded by the side frame and cross members, and the storage battery and fuel tank can be protected.

Preferably, the storage battery is disposed below a rear seat that is mounted on the vehicle body frame, and the compressed fuel tank is disposed behind the rear seat. The center of gravity of the vehicle is therefore lowered and the vehicle interior space is effectively used in a fuel cell vehicle.

In a preferred form, the subframe has a support member that allows the storage battery to be detachable in a state in which the subframe is mounted on the vehicle body frame. Therefore, a storage battery can easily be mounted on the subframe from below the subframe merely by being attached to the support member, and the mounting work is facilitated.

Desirably, the subframe has a suspension member that can support a wheel.

According to another aspect of the present invention, there is provided a vehicle body structure used in a fuel cell automobile driven by power generated by a fuel cell, the structure comprising a vehicle body frame extending in the front/rear direction of the vehicle body, and a subframe mounted on the lower portion of the vehicle body frame, wherein the subframe is formed in a rectangular shape having side frames extending in the front/rear direction of the vehicle body and disposed on the left and right of the vehicle body, a front cross member mounted on the front end of the left and right side frames, an intermediate cross member mounted parallel to the front cross member and attached to the left and right side frames, and a rear cross member mounted parallel to the front cross member on the rear end of the left and right side frames, and wherein the front cross member and the intermediate cross member allow a storage battery to be mounted, and the intermediate cross member and the rear cross member allow a substantially cylindrically-shaped compressed gas fuel tank to be mounted.

Preferably, the storage battery is disposed below a rear seat that is mounted on the vehicle body frame, and the compressed fuel tank is disposed behind the rear seat. The center of gravity of the vehicle is therefore lowered and the vehicle interior space is effectively used in a fuel cell vehicle.

Desirably, the subframe has a support member that allows the storage battery to be detachable in a state in which the subframe is mounted on the vehicle body frame.

It is desirable that the subframe has a suspension member for supporting a wheel. A damper is disclosed in the embodiments as an example of the suspension member.

The compressed gas fuel tank comprises a gas input/output valve disposed at a widthwise end of the vehicle body and is disposed such that the valve is offset from the suspension member in a front-rear direction of the vehicle body. Since the two ends of the compressed gas fuel tank therefore are set away from the suspension member, the total length of the compressed gas fuel tank is extended, thereby increasing the tank capacity.

Preferably, the structure further comprises a front subframe and an intermediate subframe, each mounted on the lower portion of the body frame and disposed in front of the subframe.

It is desirable that the intermediate subframe allows the fuel cell to be mounted such that the fuel cell is positioned below the cabin of the vehicle interior.

In a desired form, the front subframe allows a drive motor for driving the vehicle to be mounted, and is disposed within a motor compartment formed in the front portion of the vehicle.

The storage battery may be divided into left and right storage batteries, and a conductor for electrically connecting the left and right storage batteries is disposed between the left and right storage batteries.

Preferably, an exhaust pipe connected to the fuel cell is disposed below the conductor and higher than the lower surface of the storage battery. Therefore, the exhaust pipe does not protrude from the bottom of the vehicle, the exhaust pipe is protected, and the wind resistance created during vehicle travel is also reduced.

BRIEF DESCRIPTION OF THE DRAWINGS

Certain preferred embodiments of the present invention will be described in detail below, by way of example only, with reference to the accompanying drawings, in which:

FIG. 1 is a schematic side view illustrating a vehicle having a vehicle body structure according to the present invention;

DESCRIPTION OF THE PREFERRED EMBODIMENTS

Figure 1:
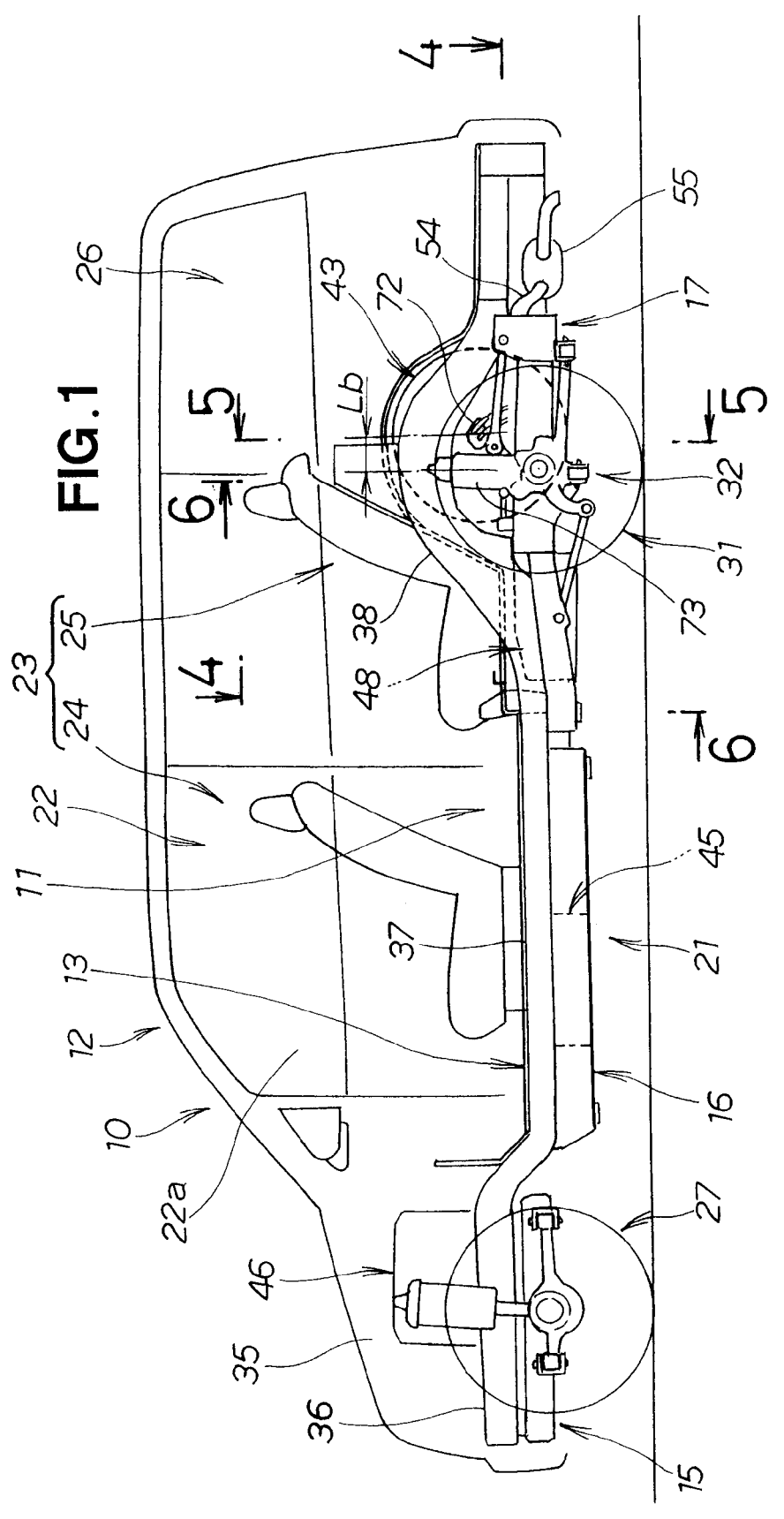
Figure 2:
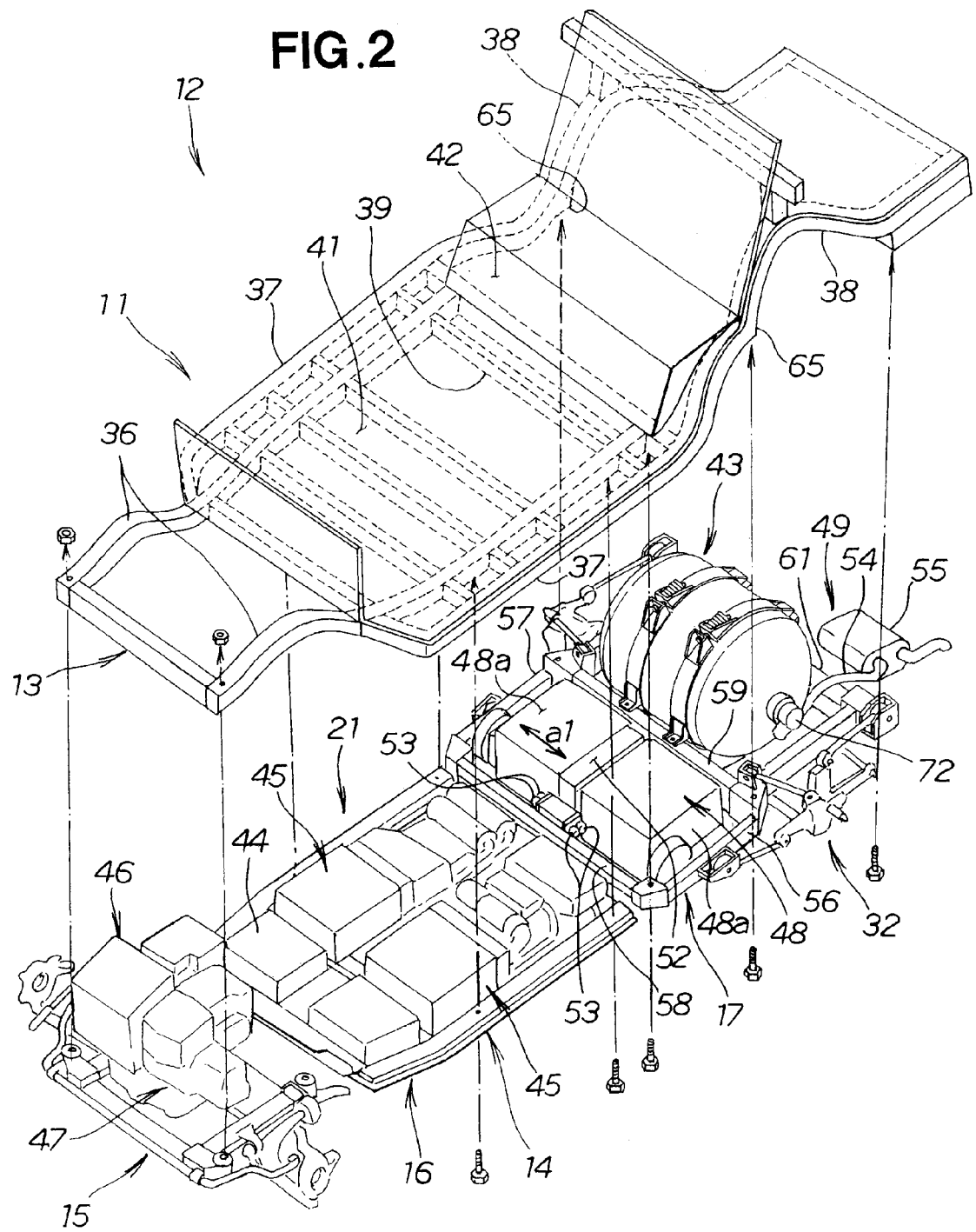
FIG. 2 is a perspective view of the vehicle body structure according to the present invention.

The vehicle 10 shown in FIG. 1 is a fuel cell vehicle. The vehicle 10 is provided with the vehicle body structure 11 of the present invention, a fuel cell system 21, seats 23 comprising a front seat 24 and a rear seat 25 disposed in the vehicle interior 22, a luggage compartment 26, front wheels 27, rear wheels 31, and a rear suspension 32. The front seat 24 is disposed in the cabin 22a of the vehicle interior 22.

The vehicle body structure 11 constitutes a portion of the vehicle body 12 and comprises a vehicle body frame 13 that extends in the front/rear direction of the vehicle 10, and a subframe 14 mounted in the lower portion of the vehicle body frame 13. The subframe 14 comprises a front subframe 15, an intermediate subframe 16, and a rear subframe 17.

FIG. 2 shows a vehicle body frame 13 provided with the vehicle body structure 11 of the present invention.

The vehicle body frame 13 is provided with left and right side frames 36 and 36, left and right side sills 37 and 37 connected to the external side of the side frames 36 and 36, left and right rear side frames 38 and 38 connected to the rear portion of the side sills 37 and 37, a floor cross member 39 mounted between the left and right rear side frames 38 and 38, a front floor 41, and a rear floor 42. The subframe 14 comprising a front subframe 15, intermediate subframe 16, and rear subframe 17 can be mounted in the lower portion of the vehicle body frame 13.

The fuel cell system 21 comprises a high-pressure hydrogen tank 43, which is a compressed gas fuel tank; an air compressor 44; fuel cells 45, 45; a power control unit 46; an electric drive motor 47; a storage battery 48; and air piping 49. The system drives the front wheels 27 (see FIG. 1) by using the electric drive motor 47.

The subframe 14 is divided into three parts. An electric drive motor 47 for driving the vehicle is disposed on the front subframe 15, fuel cells 45 and 45 are mounted on the intermediate subframe 16, a storage battery 48 is mounted on the rear subframe 17 by way of a support member 51 (FIG. 7), and a compressed gas fuel tank 43 is mounted on the rear subframe. More specifically, mounted on the subframe 14 in order from the front of the vehicle body 12 are the electric drive motor 47, fuel cells 45 and 45, storage battery 48, and compressed gas fuel tank 43. The front subframe 15 is disposed inside the engine compartment 35 formed in the front portion of the vehicle shown in FIG. 1.

The storage battery 48 comprises storage batteries 48a, 48a disposed to the left and right; a conductor 52, which is a power input/output unit and which is disposed between the storage batteries 48a, 48a; and connectors 53 mounted on the conductor 52 so as to face the left/right directions (directions of the arrow 1a) and to be detachable from the left and right directions.

Air piping 49 provides the fuel cell 45 with air (oxygen) that has been compressed by an air compressor 44, and emits used air by way of an exhaust pipe 54 and a muffler 55.

Figure 3:
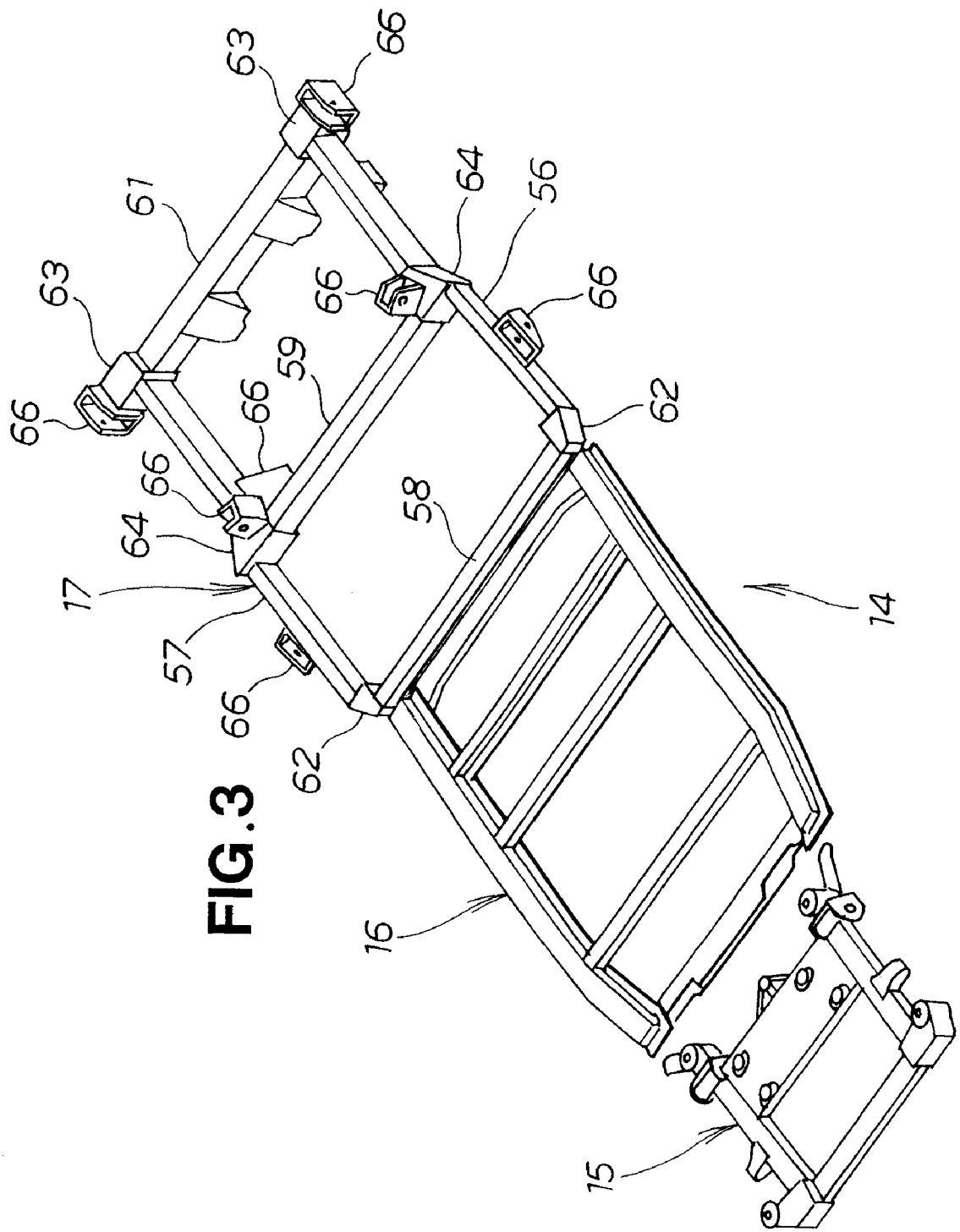
FIG. 3 is a perspective view of a subframe of FIG. 2.

The rear subframe 17 is rectangular in shape when viewed from above, as shown in FIGS. 2 and 3. A front cross member 58, intermediate cross member 59, and rear cross member 61 are mounted between left and right side frames 56 and 57 so as to form a horizontal bridge. The storage battery 48 is mounted on the front cross member 58 and intermediate cross member 59, and the compressed gas fuel tank 43 is mounted on the intermediate cross member 59 and the rear cross member 61.

The rear subframe 17 has front corner members 62 and 62 and rear corner members 63 and 63 mounted by welding in the corners. Center fasteners 64 and 64 mounted in the center between the left and right side frames 56 and 57 are mounted on intermediate fasteners 65 and 65 of the rear side frames 38 and 38 of the vehicle body frame 13 shown in FIG. 2. The rear suspension 32 is connected to connection brackets 66 and 66 mounted on the left and right side frames 56 and 57. The rear subframe 17 is a rear suspension subframe.

Figure 4:
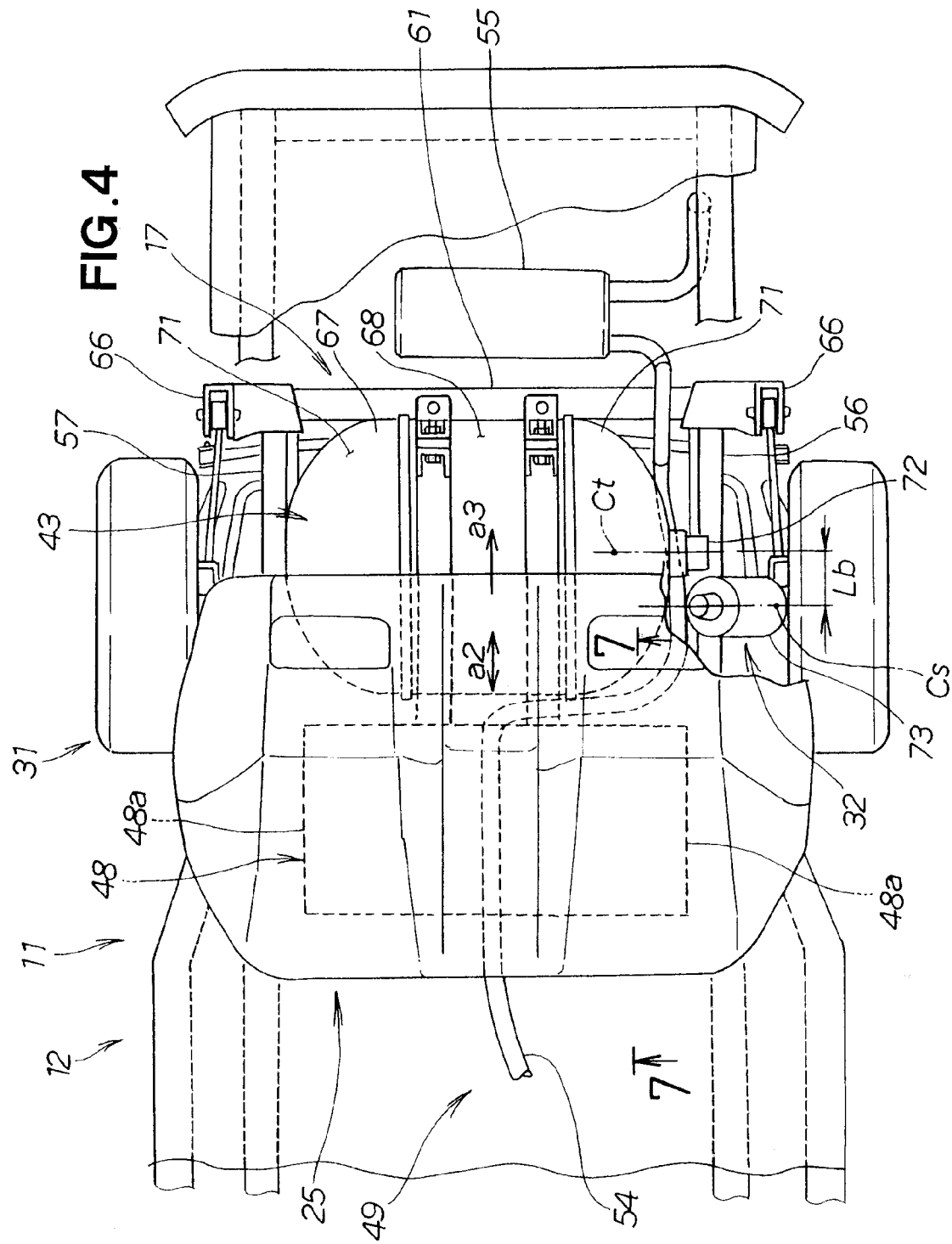
FIG. 4 is a cross-sectional view taken along line 4-4 of FIG. 1.

FIG. 4 shows the compressed gas fuel tank 43, rear suspension 32, and air piping 49.

The rear subframe 17 is furthermore configured having the storage battery 48 disposed below the rear seat 25, as shown in FIGS. 1 and 4, and the compressed gas fuel tank is disposed behind the rear seat 25.

The compressed gas fuel tank 43 is provided with a substantially cylindrical tank main body 67 (shell 68, heads 71 and 71) for storing compressed fuel gas (e.g., hydrogen gas), and a gas input/output valve 72 mounted on the head 71, which is the end portion of the tank main body 67, in a position offset by a distance Lb in the rearward direction (direction of arrow a3) of the front/rear direction (direction of the arrow a2) of the vehicle body 12 with respect to the damper 73 as a suspension member having a rear suspension 32. The reference numeral Ct denotes the center line of the compressed gas fuel tank, and Cs denotes the center line of the suspension member (damper) 73.

The exhaust pipe 54 connected to the fuel cell 45 is disposed under the power input/output unit (conductor) 52 (FIG. 1) and at a higher elevation than the lower surface 75 (see FIG. 6; more precisely, the lower surface of the conductor 52) in the center of the storage battery 48. The pipe furthermore passes in the lower vicinity of the left end (left head) 71 of the compressed gas fuel tank 43, continues above the rear cross member 61 of the rear subframe 17, connects to the muffler 55 disposed behind the rear subframe 17, and emits used low-pressure air.

Figure 5:
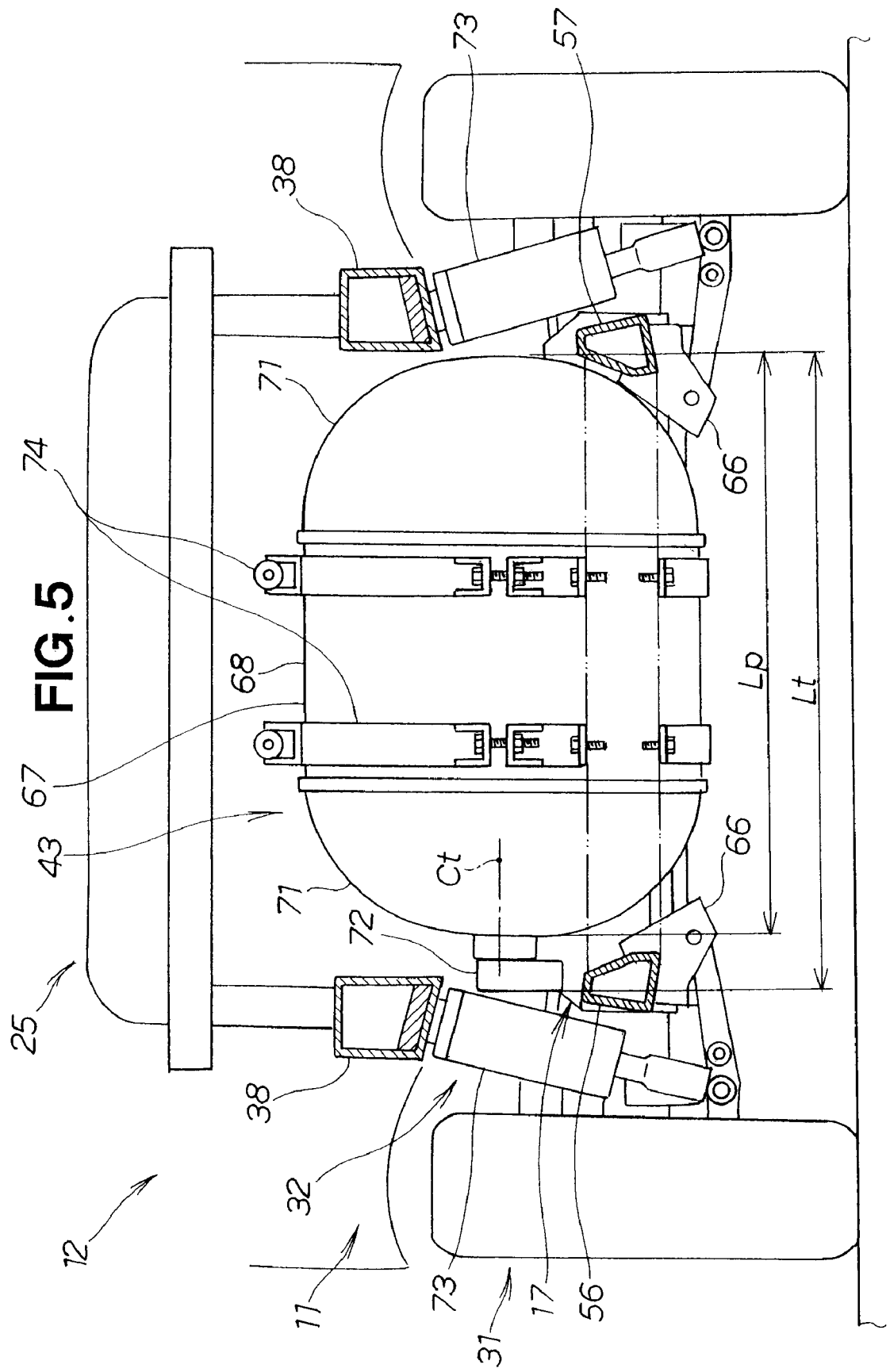
FIG. 5 is a cross-sectional view taken along line 5-5 of FIG. 1.

FIG. 5 shows the compressed gas fuel tank 43 and rear suspension 32.

The compressed gas fuel tank 43 was already described above. The tank is mounted on the rear subframe 17 and fixed by using bands 74, and is disposed between the suspension members (dampers) 73, 73, which have the rear suspension 32 mounted on the rear subframe 17.

The total length of the compressed gas fuel tank 43 is Lt, and this length includes the gas input/output valve 72 mounted on the left head 71. Lp is the total length of the tank may body 67.

Figure 6:
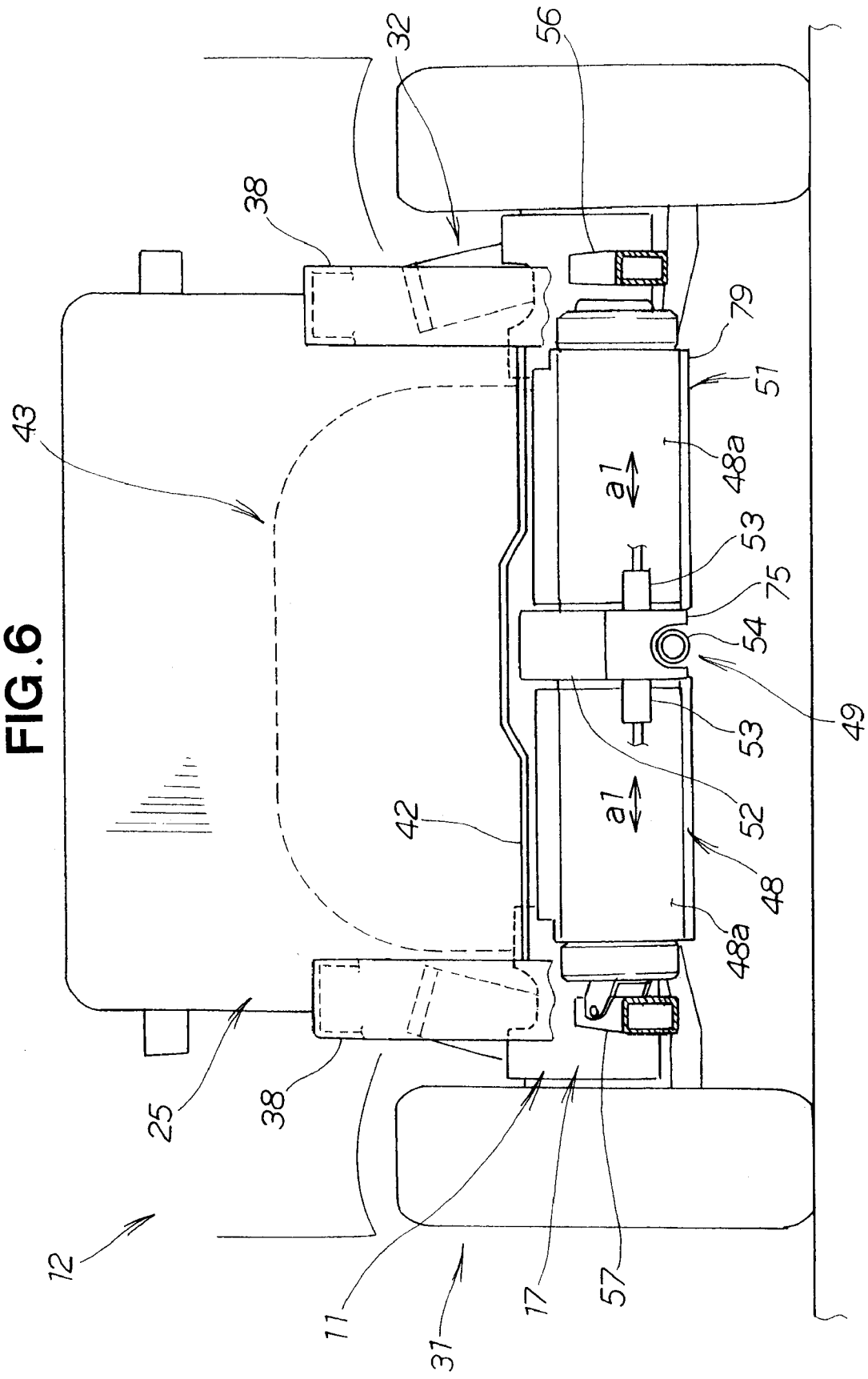
FIG. 6 is a cross-sectional view taken along line 6-6 of FIG. 1.

FIG. 6 shows the storage battery 48 and exhaust pipe 54 disposed in the vehicle body structure 11.

The vehicle body structure 11 comprises the storage battery 48 disposed below the rear seat 25, the storage batteries 48a, 48a disposed to the left and right, the conductor 52 held between the storage batteries 48a, 48a, and the exhaust pipe 54 disposed at a higher elevation than the lower surface 75 of the conductor 52. As a result, the exhaust pipe 54 does not protrude from the bottom of the vehicle body 12 and can be protected.

The exhaust pipe 54 does not protrude from the bottom of the vehicle body 12, the air that flows under the vehicle body 12 can be smoothed, and the resistance to the air flow around the traveling vehicle can be reduced.

The conductor 52 is disposed so that the connectors 53 can be detachably mounted from the left and right directions (directions of the arrow a1).

Figure 7:
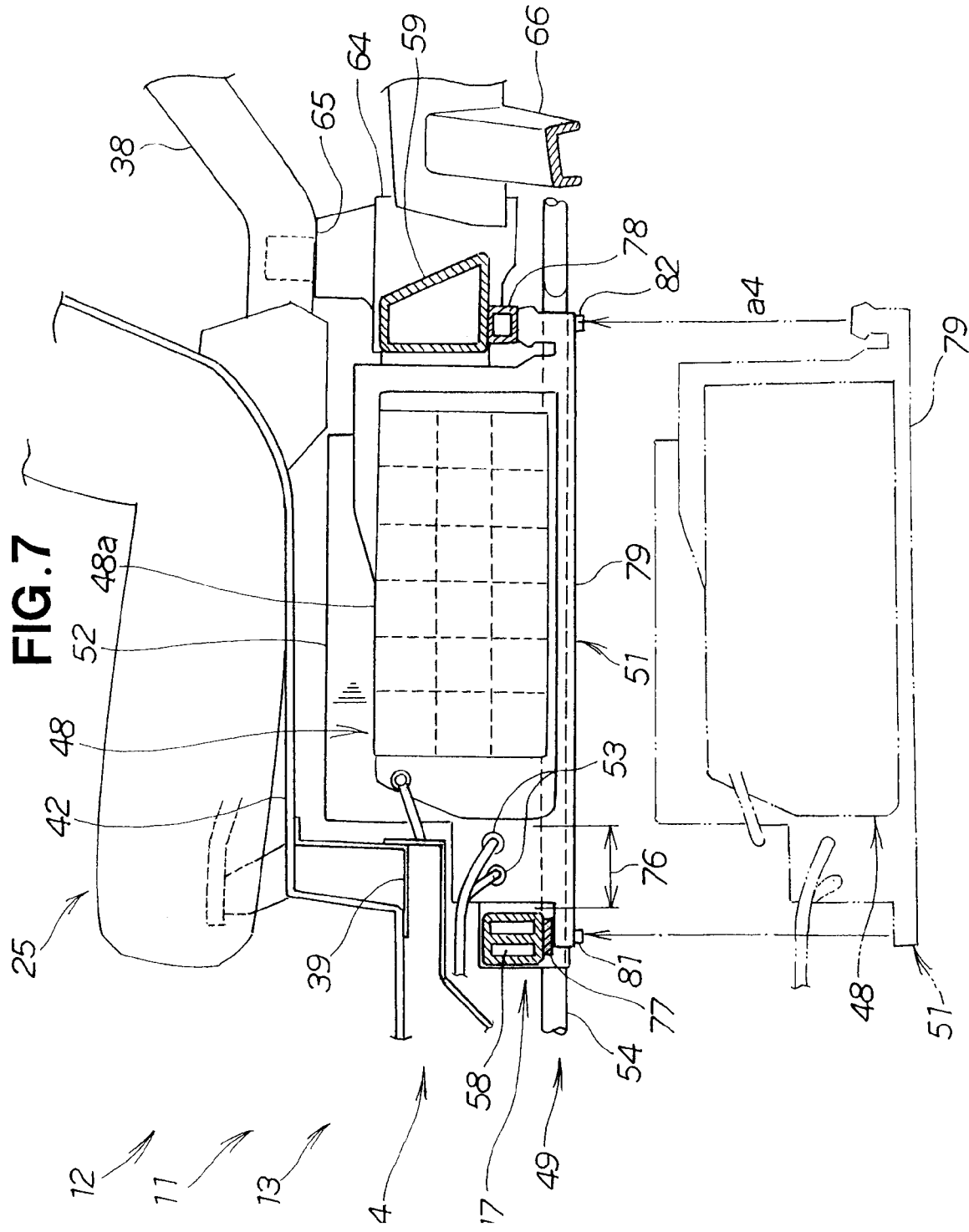
FIG. 7 is a cross-sectional view taken along line 7-7 of FIG. 4.

FIG. 7 shows the rear subframe 17 and storage battery 48.

In the vehicle body structure 11, as shown in FIGS. 6 and 7, the storage battery 48 is disposed under the rear seat 25, the storage batteries 48a, 48a are disposed to the left and right in the vehicle body 12, the conductor 52 is held between the storage batteries 48a, 48a, and the connectors 53 are set horizontally so as to be detachably mounted on the conductor 52 from the left and right directions (directions of the arrow a1). As a result, when the storage battery 48 is mounted on the vehicle body frame 13, sufficient space 76 can be provided for mounting the connectors 53.

In the vehicle body structure 11, the storage battery 48 is disposed under the rear seat 25, the storage batteries 48a, 48a are disposed to the left and right, the conductor 52 is held between the storage batteries 48a, 48a, and the connectors 53 are horizontally disposed so as to be detachably mounted on the conductor 52 from the left and right directions (directions of the arrow a1). As a result, the degree of freedom is increased for designing the cross-sectional shape (the shapes in FIG. 7) of the intermediate cross member 59 and the front cross member 58 of the rear subframe (rear suspension subframe) 17, and the desired cross-sectional shape can be achieved.

Furthermore, in the vehicle body structure 11, the storage battery 48 is disposed under the rear seat 25, the storage batteries 48a, 48a are disposed to the left and right, the conductor 52 is held between the storage batteries 48a, 48a, and the connectors 53 are horizontally disposed so as to be detachably mounted on the conductor 52 from the left and right directions (directions of the arrow a1). As a result, the degree of freedom is increased for designing the cross-sectional shape (the shape in FIG. 7) of the floor cross member 39 of the vehicle body frame 13, and the desired cross-sectional shape can be achieved.

The rear subframe 17 has a support member 51 on which the storage battery 48 is mounted and fixed.

The support member 51 comprises a front fastener 77 formed on the front cross member 58 of the rear subframe 17, a rear fastener 78 formed on the intermediate cross member 59, and a mounting support member 79 on which the storage battery 48 is mounted. The front of the mounting support member 79 is fastened to the front fastener 77 of the front cross member 58 by using a bolt 81. The rear of the mounting support member 79 is fastened to the rear fastener 78 of the intermediate cross member 59 by using a bolt 82.

The configuration of the vehicle body structure of the present invention is described next.

The rear subframe 17 can accommodate the storage battery 48 by mounting the battery in the space enclosed by the front cross member 58 and intermediate cross member 59, as shown in FIGS. 2 and 7.

Thus, the vehicle body structure 11 is configured so that the front cross member 58, intermediate cross member 59, and rear cross member 61 are mounted on the left and right side frames 56 and 57 to the rear subframe 17 in a rectangular shape, the storage battery 48 is mounted on the front cross member 58 and intermediate cross member 59, the compressed gas fuel tank 43 is mounted on the intermediate cross member 59 and rear cross member 61, the storage battery 48 is disposed below the rear seat 25, and the compressed gas fuel tank 43 is disposed behind the rear seat 25. Therefore, the space enclosed by the intermediate cross member 59 and front cross member 58 of the rear subframe 17 mounted in the lower portion of the vehicle body frame 13 can be used to accommodate the storage battery 48. The space of the vehicle body 12 can therefore be effectively used and the storage battery 48 can be disposed at a low center of gravity.

Furthermore, the vehicle body structure 11 can be configured so that the storage battery 48 is mounted on the front cross member 58 and intermediate cross member 59, the compressed gas fuel tank 43 is mounted on the intermediate cross member 59 and rear cross member 61, the storage battery 48 is disposed below the rear seat 25, and the compressed gas fuel tank 43 is disposed behind the rear seat 25. Therefore, the storage battery 48 can be enclosed by the front cross member 58 and intermediate cross member 59, and the storage battery 48 can be protected.

The compressed gas fuel tank 43 can furthermore be protected by the intermediate cross member 59 and rear cross member 61.

Figure 8:
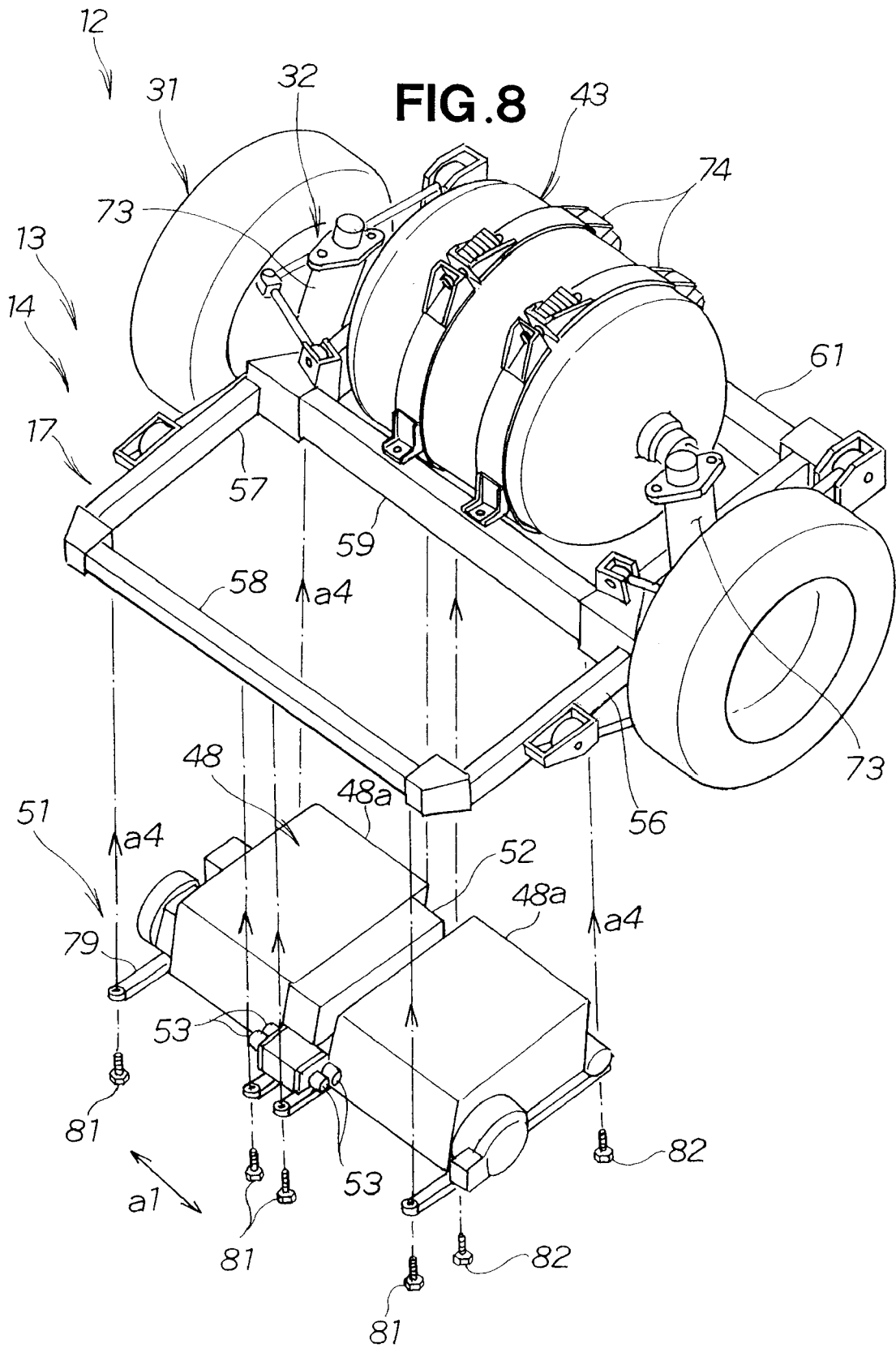
FIG. 8 is a perspective view showing a state in which storage batteries are mounted on a rear subframe of FIG. 3.
Figure 9:
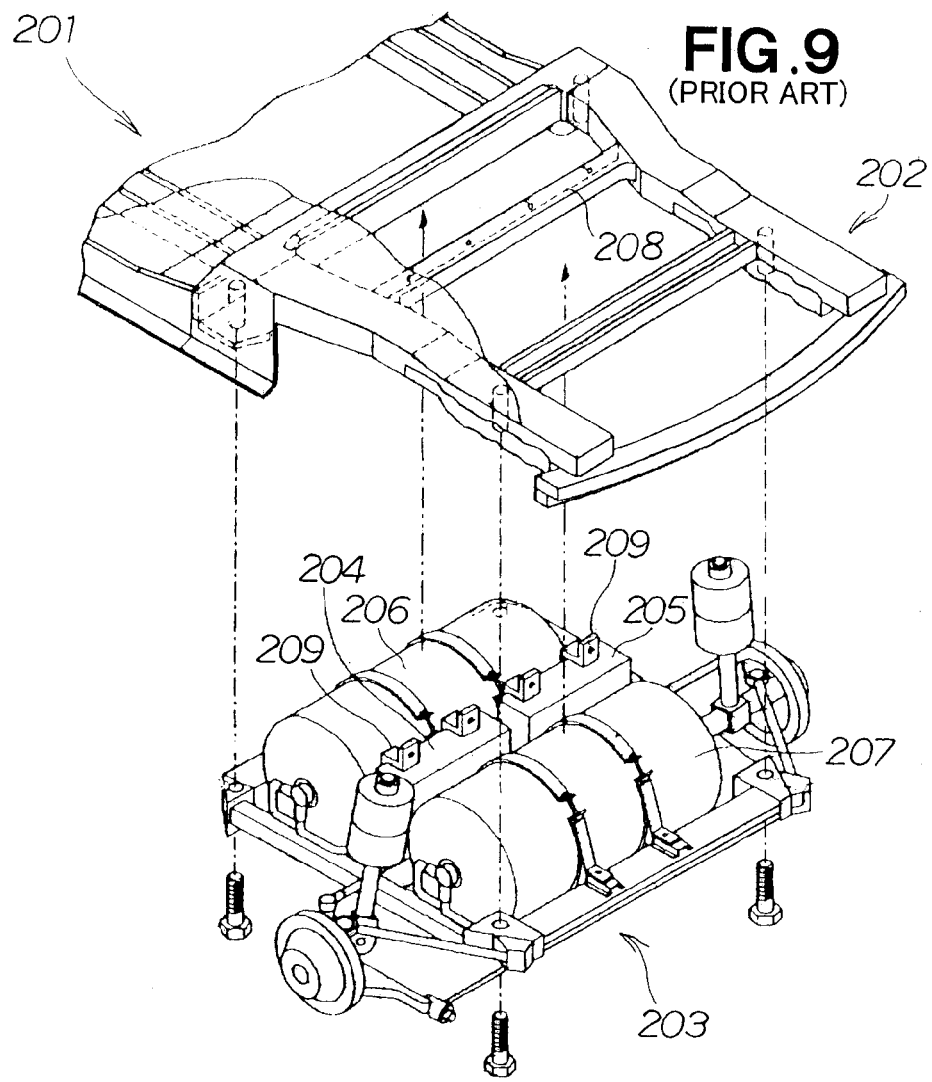
FIG. 9 is a schematic view showing a state in which a fuel tank and storage batteries are mounted on a subframe of a conventional vehicle body structure.
Figure 10:
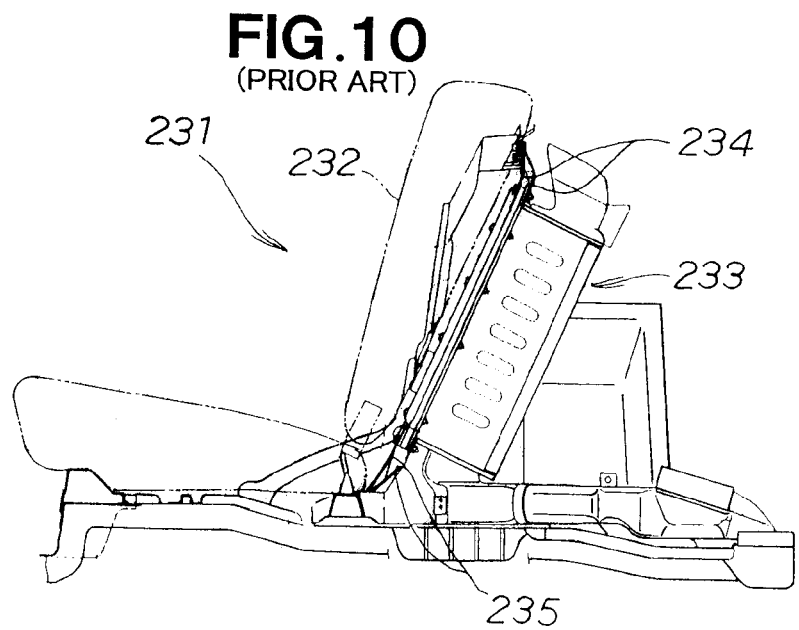
FIG. 10 is a schematic view of a separate conventional arrangement in which a storage battery is disposed behind the rear seat.

FIG. 8 shows the function of the rear subframe 17 included in the vehicle body structure 11 of the present invention.

The storage battery 48 is mounted from below on the vehicle body 12, as shown in FIGS. 7 and 8.

In other words, the rear subframe 17 is integrally connected to the vehicle body frame 13 that constitutes a portion of the vehicle body 12, and the mounting support member 79 on which the storage battery 48 is mounted is thereafter mounted by being raised from below as indicated by the arrows a4 and fastened with the bolts 81 and 82 screwed into the front cross member 58 and intermediate cross member 59, respectively with a prescribed axial force (controlled torque, for example).

The mounting support member is lowered when the storage battery 48 is to be removed from the vehicle body 12.

More specifically, the storage battery 48 can be detached together with the mounting support member 79 by loosening the bolts 81 and 82.

Thus, in the vehicle body structure 11, the support member 79 allows the storage battery 48 to be detached in a state in which the rear subframe 17 is mounted on the vehicle body frame 13. Therefore, the storage battery 48 can be detached from below the rear subframe 17 by using the support member 79. As a result, the storage battery 48 is easily mounted and detached even when the space of the vehicle body 12 is effectively used in this manner.

In the vehicle body structure 11, as shown in FIGS. 1, 4, and 5, the compressed gas fuel tank 43 is provided with a substantially cylindrical tank main body 67 for storing compressed fuel gas, and the gas input/output valve 72 at the end portion of the tank main body 67 is disposed in a position offset by a distance Lb in the front/rear direction (directions of the arrow a2) of the vehicle body 12 with respect to the suspension member (damper) 73. Therefore, the total length Lt of the compressed gas fuel tank 43 can be extended and the tank capacity can be increased.

An example was described in the above-described embodiment in which the vehicle body structure of the present invention was applied to a fuel cell automobile that is driven by power generated by fuel cells, but the present invention is not limited to application in a fuel cell automobile, and the above-described vehicle body structure can also be applied to ordinary passenger vehicles.

Obviously, various minor changes and modifications of the present invention are possible in light of the above teaching. It is therefore to be understood that within the scope of the appended claims the invention may be practiced otherwise than as specifically described.

What is claimed is:

1. A vehicle body structure, comprising:
   a vehicle body frame extending longitudinally of a vehicle body; and
   a subframe mounted on a lower portion of the body frame of the vehicle body,
   wherein the subframe is formed in a rectangular shape having:
   side frames extending longitudinally of the vehicle body and disposed on left and right sides of the vehicle body;
   a front cross member mounted on front ends of the left and right side frames;
   an intermediate cross member mounted parallel to the front cross member and attached to the left and right side frames; and
   a rear cross member mounted parallel to the front cross member on rear ends of the left and right side frames,
   and wherein the front cross member and the intermediate cross member are adapted to receive a storage battery in between, and the intermediate cross member and the rear cross member are adapted to receive a fuel tank in between,
   wherein a top surface of the intermediate cross member that faces toward the body frame includes a fuel tank attachment area for connection of the fuel tank with the intermediate cross member and a bottom surface of the intermediate cross member that faces away from the top surface includes a storage battery attachment area for connection of the storage battery to the intermediate cross member,
   and wherein the subframe has a mounting support member on which the storage battery is mounted, the mounting support member having a front top surface connected to a bottom surface of the front cross member and a rear top surface connected to the bottom surface of the intermediate cross member.

2. The vehicle body structure of claim 1, wherein the storage battery is disposed below a rear seat that is mounted on the vehicle body frame, and the fuel tank is disposed behind the rear seat.

3. The vehicle body structure of claim 1, wherein the support member of the subframe allows the storage battery to be detachable in a state in which the subframe is mounted on the vehicle body frame.

4. The vehicle body structure of claim 1, wherein the subframe has a suspension member for supporting a wheel.

5. A vehicle body structure used in a fuel cell automobile driven by power generated by a fuel cell, the structure comprising:
   a vehicle body frame extending longitudinally of a vehicle body; and
   a subframe mounted on a lower portion of the vehicle body frame,
   wherein the subframe is formed in a rectangular shape having:
   side frames extending longitudinally of the vehicle body and disposed on left and right sides of the vehicle body;
   a front cross member mounted on front ends of the left and right side frames;
   an intermediate cross member mounted parallel to the front cross member and attached to the left and right side frames; and
   a rear cross member mounted parallel to the front cross member on rear ends of the left and right side frames,
   and wherein the front cross member and the intermediate cross member are adapted to receive a storage battery in between, and the intermediate cross member and the rear cross member are adapted to receive a substantially cylindrically-shaped compressed gas fuel tank in between,
   wherein a top surface of the intermediate cross member that faces toward the body frame includes a fuel tank attachment area for connection of the compressed gas fuel tank with the intermediate cross member and a bottom surface of the intermediate cross member that faces away from the top surface includes a storage battery attachment area for connection of the storage battery to the intermediate cross member,
   and wherein the subframe has a mounting support member on which the storage battery is mounted, the mounting support member having a front top surface connected to a bottom surface of the front cross member and a rear top surface connected to the bottom surface of the intermediate cross member.

6. The vehicle body structure of claim 5, wherein the storage battery is disposed below a rear seat that is mounted on the vehicle body frame, and the compressed gas fuel tank is disposed behind the rear seat.

7. The vehicle body structure of claim 5, wherein the support member of the subframe allows the storage battery to be detachable in a state in which the subframe is mounted on the vehicle body frame.

8. The vehicle body structure of claim 5, wherein the subframe has a suspension member for supporting a wheel.

9. The vehicle body structure of claim 8, wherein the compressed gas fuel tank comprises a gas input/output valve disposed at a widthwise end of the vehicle body and is disposed such that the valve of the tank is offset from the suspension member in a front-rear direction of the vehicle body.

10. The vehicle body structure of claim 5, further comprising a front subframe and an intermediate subframe, each mounted on the lower portion of the body frame and disposed in front of the subframe.

11. The vehicle body structure of claim 10, wherein the intermediate subframe allows the fuel cell to be mounted such that the fuel cell is positioned below a cabin of the vehicle interior.

12. the vehicle body structure of claim 10, wherein the front subframe allows a drive motor for driving the vehicle to be mounted, and is disposed within a motor compartment formed in the front portion of the vehicle.

13. The vehicle body structure of claim 5, wherein the storage battery is divided into left and right storage batteries, and a conductor for electrically connecting the left and right storage batteries is disposed between the left and right storage batteries.

14. The vehicle body structure of claim 13, wherein an exhaust pipe connected to the fuel cell is disposed below the conductor and higher than a lower surface of the storage battery.

* * * * *